(12) United States Patent
Bekaert

(10) Patent No.: US 12,221,028 B2
(45) Date of Patent: *Feb. 11, 2025

(54) AWNING ASSEMBLY

(71) Applicant: Dometic Sweden AB, Solna (SE)

(72) Inventor: Miguel Bekaert, Geluwe (BE)

(73) Assignee: Dometic Sweden AB, Solna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,821

(22) Filed: Apr. 28, 2023

(65) Prior Publication Data

US 2023/0264622 A1    Aug. 24, 2023

Related U.S. Application Data

(63) Continuation of application No. 16/422,971, filed on May 25, 2019, now Pat. No. 11,639,131.

(30) Foreign Application Priority Data

May 28, 2018   (DE) .......................... 102018208370.3

(51) Int. Cl.
*E04F 10/06* (2006.01)
*B60P 3/34* (2006.01)
*E04H 15/08* (2006.01)

(52) U.S. Cl.
CPC .......... *B60P 3/343* (2013.01); *E04F 10/0614* (2013.01); *E04F 10/0625* (2013.01); *E04H 15/08* (2013.01)

(58) Field of Classification Search
CPC .............. E04F 10/0614; E04F 10/0603; E04F 10/0625; E04F 10/0648; E04F 10/0662;
(Continued)

(56) References Cited

U.S. PATENT DOCUMENTS 3,612,145 A * 10/1971 Darula ................ E04F 10/0681
160/67
3,720,438 A    3/1973 Johnson
(Continued)

FOREIGN PATENT DOCUMENTS

AU    2007214277    10/2013
AU    2013331123    3/2016
(Continued)

OTHER PUBLICATIONS

Office Action Issued in AU Application No. 2019203640 mailed on Mar. 28, 2024.
(Continued)

*Primary Examiner* — Abe Massad
(74) *Attorney, Agent, or Firm* — Dinsmore & Shohl LLP

(57) ABSTRACT

The present embodiments are directed to an awning assembly for a recreational vehicle comprising a main body, a flexible awning material, a roller tube, a lead rail, at least one support leg hinged to the lead rail, and at least one tension rafter being mountable between the main body and the lead rail. The at least one support leg is hinged to the lead rail so that the support leg can be hinged into a first storage section of the lead rail frame. The lead rail frame comprises a second storage section for receiving the tension rafter therein, wherein the second storage section comprises an opening, wherein either holder is disposed within the opening, or the tension rafter is self-clamping into the second storage section.

12 Claims, 10 Drawing Sheets

(58) Field of Classification Search
CPC . E04F 10/0681; E04F 10/0666; E04F 10/067;
E04F 10/0674
See application file for complete search history.

(56) References Cited

U.S. PATENT DOCUMENTS

| | | | |
|---|---|---|---|
| 4,020,888 | A | 5/1977 | Upton et al. |
| 4,164,972 | A | 8/1979 | Bennett |
| 4,171,013 | A | 10/1979 | Clark |
| 4,524,791 | A | 6/1985 | Greer |
| 5,044,416 | A | 9/1991 | Murray |
| 5,094,285 | A | 3/1992 | Murray |
| 5,174,352 | A | 12/1992 | Murray et al. |
| 5,207,255 | A | 5/1993 | Shannon |
| 5,449,032 | A * | 9/1995 | Blevins .............. E04H 15/08 296/214 |
| 5,558,145 | A | 9/1996 | Baka |
| 5,622,214 | A | 4/1997 | Baka |
| 5,636,675 | A | 6/1997 | Baka et al. |
| 5,732,756 | A | 3/1998 | Malott |
| 5,794,679 | A | 8/1998 | Williams et al. |
| 5,924,465 | A | 7/1999 | Malott |
| 5,944,085 | A | 8/1999 | Malott |
| 6,006,810 | A | 12/1999 | Malott |
| 6,029,732 | A | 2/2000 | Malott |
| 6,095,221 | A | 8/2000 | Frey |
| 6,131,638 | A | 10/2000 | Levin |
| 6,230,783 | B1 | 5/2001 | Frey, Jr. |
| 6,260,908 | B1 | 7/2001 | Fraula |
| 6,276,424 | B1 | 8/2001 | Frey, Jr. |
| 6,279,641 | B1 | 8/2001 | Malott |
| 6,378,591 | B1 | 4/2002 | McCoy |
| 6,494,246 | B1 * | 12/2002 | Blevins .............. E04F 10/067 160/67 |
| 6,829,861 | B1 | 12/2004 | Kobrehel |
| 6,840,568 | B2 | 1/2005 | Carrillo |
| 6,843,301 | B2 | 1/2005 | Carrillo |
| 6,874,559 | B1 | 4/2005 | Hicks |
| 6,941,700 | B1 | 9/2005 | Kobrehel |
| 7,077,458 | B2 | 7/2006 | Malott |
| 7,281,560 | B2 | 10/2007 | Hicks |
| 7,556,079 | B2 | 7/2009 | Hicks |
| 7,740,044 | B2 | 6/2010 | Gutierrez |
| 8,316,910 | B2 | 11/2012 | Popa |
| 9,057,198 | B2 | 6/2015 | Beland |
| 9,469,996 | B2 | 10/2016 | Ma |
| 9,695,635 | B2 | 7/2017 | Taylor |
| 9,834,952 | B1 | 12/2017 | Meyers |
| 9,889,788 | B2 | 2/2018 | Beland |
| 9,956,900 | B2 | 5/2018 | Beland |
| 10,576,917 | B2 | 3/2020 | Taylor |
| 11,639,131 | B2 | 5/2023 | Bekaert |
| 2013/0098562 | A1 | 4/2013 | Gutierrez |
| 2017/0088068 | A1 | 3/2017 | Taylor |
| 2017/0138056 | A1 | 5/2017 | Albertson |
| 2018/0162260 | A1 | 6/2018 | Beland |
| 2018/0313090 | A1 | 11/2018 | Meyers |
| 2019/0359110 | A1 | 11/2019 | Bekaert |
| 2020/0317145 | A1 | 10/2020 | Taylor |

FOREIGN PATENT DOCUMENTS

| | | |
|---|---|---|
| AU | 2016201189 | 5/2018 |
| AU | 2018201135 | 9/2019 |
| AU | 2019203065 | 12/2019 |
| AU | 2019203640 | 12/2019 |
| CA | 2599185 | 2/2008 |
| CA | 2888620 | 4/2014 |
| CA | 2948854 | 11/2015 |
| CA | 2948856 | 11/2015 |
| CA | 2948063 | 5/2017 |
| CA | 2942465 | 1/2018 |
| CA | 3001819 | 10/2018 |
| CN | 1131447 | 9/1996 |
| CN | 1856629 | 11/2006 |
| CN | 206049489 | 3/2017 |
| CN | 107208424 | 9/2017 |
| CN | 110541600 | 12/2019 |
| DE | 69203483 T2 | 2/1996 |
| DE | 69409768 | 5/1998 |
| DE | 102005040756 | 3/2007 |
| DE | 69935185 | 4/2007 |
| DE | 19802944 B4 | 9/2007 |
| DE | 202007010326 U1 | 9/2007 |
| DE | 202009005040 U1 | 9/2009 |
| DE | 602007009615 | 11/2010 |
| DE | 202011000580 U1 | 6/2011 |
| DE | 19726712 B4 | 10/2012 |
| DE | 102010052285 B4 | 11/2013 |
| DE | 102017208921 | 6/2018 |
| DE | 102017208921 B3 | 6/2018 |
| DE | 102018208370 | 11/2018 |
| DE | 102018208370 A1 | 11/2018 |
| DE | 102017215282 | 2/2019 |
| DE | 102018208374 | 5/2019 |
| DE | 102018208374 B3 | 5/2019 |
| EP | 036677 B1 | 5/1992 |
| EP | 0501581 | 9/1992 |
| EP | 657323 | 6/1995 |
| EP | 0686742 A1 | 12/1995 |
| EP | 980787 | 2/2000 |
| EP | 1396592 | 3/2004 |
| EP | 1439091 | 7/2004 |
| EP | 1627976 | 2/2006 |
| EP | 1767722 A2 | 3/2007 |
| EP | 1895070 | 3/2008 |
| EP | 1895071 | 3/2008 |
| EP | 3145739 | 3/2017 |
| EP | 3145740 | 3/2017 |
| JP | 2007062720 | 3/2007 |
| WO | 2014063038 | 4/2014 |
| WO | 2015175990 | 11/2015 |
| WO | 2015176013 | 11/2015 |

OTHER PUBLICATIONS

DE Application No. 102018208370.3 filed May 28, 2018 titled Awning Assembly.
Australian Application No. 2016222517 filed Sep. 5, 2016 titled Awning Assembly.
Dometic Product Catalog—Awnings, 2015.
Dometic Product Catalog—Awnings, 2016.
Office Action Issued in China Patent Application No. 201910449263.3 mailed on Oct. 11, 2021.
Office Action Issued in China Patent Application No. 201910449263.3 mailed on Apr. 19, 2022.
Non Final Office Action Issued in U.S. Appl. No. 16/422,971 mailed on Jan. 21, 2022.
Final Office Action Issued in U.S. Appl. No. 16/422,971 mailed on Jun. 29, 2022.
Notice of Grant Issued in China Patent Application No. 201910449263.3 mailed on Jul. 25, 2022.
Patent Certificate Issued in China Patent Application No. 201910449263.3 mailed on Oct. 21, 2022.
Notice of Allowance Issued in U.S. Appl. No. 16/422,971 mailed on Dec. 14, 2022.
U.S. Appl. No. 16/422,971, filed May 25, 2019.
Examination Report mailed in DE Patent Application No. 102017208923.7 on Feb. 9, 2018.
Decision to Grant mailed in DE Patent Application No. 102018208374.6 on Feb. 13, 2019.
Decision to Grant mailed in DE Patent Application No. 102017208921.0 on Mar. 5, 2018.
AU Patent Application No. 2019203065 filed on Apr. 30, 2019.
AU Patent Application No. 2019203640 filed on May 24, 2019.
CN Patent Application No. 201910449263.3 filed on May 28, 2019.
DE Patent Application No. 102017208923.7 filed on May 26, 2017.
Examination Report mailed in DE Patent Application No. 102018208370.3 on Dec. 5, 2019.

(56) References Cited

OTHER PUBLICATIONS

Decision to Grant mailed in DE Patent Application No. 102018208370.3 on Mar. 3, 2021.
Notice of Acceptance Issued in AU Application No. 2019203065 mailed on Jul. 1, 2024.
Notice of Acceptance Issued in AU Application No. 2019203640 mailed on Aug. 16, 2024.
Office Action Issued in AU Application No. 2019203065 mailed on Jun. 6, 2024.
AU Patent Application No. 2024267067, entitled "Awning Assembly" filed on Nov. 29, 2024.

* cited by examiner

AWNING ASSEMBLY

CLAIM TO PRIORITY

This continuation patent application claims priority to and benefit of, under 35 U.S.C. § 120, U.S. patent application Ser. No. 16/422,971, filed May 25, 2019, titled, "Awning Assembly" which claims priority, under 35 U.S.C. § 119(a), to German Patent Application Number 102018208370.3 filed May 28, 2018, also titled, "Awning Assembly", all of which is incorporated by reference herein.

BACKGROUND

1. Field of the Invention

The present embodiments relate to an awning assembly for a vehicle, especially for a recreation vehicle, e.g. a camper, a caravan or a mobile home. The awning assemblies may be used to shelter an area next to the recreational vehicle from direct sunlight or from rain.

2. Description of the Related Art

In general, such awning assemblies comprise a main body which is fixable to a support structure of the recreational vehicle, e.g. a side wall. A roller tube is rotatably supported at the back cover so that a flexible awning material can be selectively rolled onto or from the roller tube. To achieve this effect, a lead rail is provided which is connected to a first end of the flexible awning material, wherein the second end of the flexible awning material is connected to the roller tube. Thus, by moving the lead rail away from the main body the flexible awning material is rolled off from the roller tube.

For supporting the lead rail, such awning assemblies generally comprise at least one tension rafter and at least one support leg. In general, the tension rafter is mountable between the main body and the lead rail when the flexible awning material is rolled off from the roller tube. In addition, the at least one support leg is also attached to the lead rail in a substantially perpendicular direction to support the lead rail on the ground surface when the awning assembly is in an operating state. To facilitate the handling, the lead rail often comprises lead rail frame, wherein the support leg is hinged to the lead rail so that the support leg can be hingewise moved into a first storage section of the lead rail frame in which the longitudinal axis of the support leg is substantially parallel to the longitudinal axis of the lead rail. Thus, when assembling and disassembling the awning assembly, there is no need to remove the at least one support leg from the lead rail, which facilitates the handling of the awning assembly.

The tension rafter can have different forms and may e.g. be provided in form of arm assemblies having two parts being hinged together. Such an arrangement is shown in EP 1 767 722 A2. However, such complex arm assemblies distinctly increase the dimensions of the awning assembly and the costs thereof.

Thus, there are also solutions known comprising a tension rafter which is simply manually mounted between the lead rail and main body. To account for different distances between the main body and the lead rail and also to have a certain tension between the main body and the lead rail, the tension rafters are mostly telescopic tension rafters. The tension rafters are easy to handle and are generally stored within the recreational vehicle when the awning assembly is not in use.

However, this bears the risk that the tension rafter gets lost or is forgotten somewhere, so that the awning assembly may not be used correctly when the recreational vehicle is parked. In addition, the available space within the recreational vehicle is often limited so that it is generally desirable to reduce the number of items which are to be stored or secured within the recreation vehicle.

In view of this, an object of the present embodiments is to provide an awning assembly which allows for a secure storage of the tension rafter when not in use.

SUMMARY

The present embodiments provide an awning assembly for a vehicle, especially a recreational vehicle, comprising a main body, a flexible awning material, a roller tube, a lead rail, at least one support leg hinged to the lead rail, and at least one tension rafter being mountable between the main body and the lead rail.

The roller tube is rotatably supported at the main body, and a first end of the flexible awning material is attached to the roller tube and a second end of the flexible awning material is attached to the lead rail so that moving the lead rail relative to the main body selectively rolls the flexible awning material onto or from the roller tube.

According to some embodiments, the lead rail comprises a lead rail frame, wherein the at least one support leg is hinged to the lead rail so that the support leg can be hingewise moved into a first storage section of the lead rail frame in which the longitudinal axis of the support leg is substantially parallel to the longitudinal axis of the lead rail.

According to some embodiments, the lead rail frame comprises a second storage section for receiving the tension rafter therein, while the second storage section comprises an opening, wherein either a holding means is disposed within the opening, or the tension rafter is self-clamping into the second storage section.

Thus, not only the support leg is stored in a specific storage section of the lead guide rail, but also the tension rafter is manually stored in the second storage section, which is included in the lead rail frame and, hence, not within the recreational vehicle. As such, the tension rafter shall not be stored within e.g. the recreational vehicle when the awning assembly is not in use. This greatly reduces the risk of the tension rafter to get lost and thus to corrupt the correct functionality of the awning assembly. In addition, this also facilitates room use within the recreational vehicle.

In some embodiments, the second storage section is an integral member of the lead rail frame. This allows for a compact design. In addition, manufacturing is greatly facilitated as the entire lead rail frame including the second storage section can be provided e.g. by continuous profile casting. In particular, the lead rail frame can be made of an aluminum alloy or a plastic material.

In some embodiments, the second storage section comprises an opening, wherein a holding means is disposed within the opening, the holding means being configured to receive at least a part the tension by form-lock fixing. Thus, the tension rafter can be introduced into the second storage section via the opening and is securely held therein in being form-locked fixed to the holding means. Hence, the tension rafter cannot unintentionally be lost. Further, due to the form-lock fixing rattling noises or the like which may occur due to vibrations during movement of the recreational vehicle are also greatly reduced.

In some embodiments, the holding means is at least partially composed of a flexible material. Thus, the holding means can firstly be manually bent, then the tension rafter is introduced and finally the holding means is unhanded so that it returns to its original shape and locks the tension rafter by form-fixing within the second storage section.

In this connection, it may be desirable that the holding means comprises a bracket, wherein the bracket is elastically movable between a holding position and a releasing position, so that the tension rafter can be inserted or removed from the second storage section when the bracket is in the releasing position. This allows for a very convenient handling.

In some embodiments, the holding means comprises a hooking projection and the lead rail frame comprises an abutment protrusion, wherein the hooking projection hooks into the abutment protrusion. As such, the holding means can be secured to the lead rail frame without the need for a further attachment means, e.g. a screw or the like. In addition, this allows for a fast replacement of the holding means in case the holding means is defect. The abutment protrusion may be integrally formed with the lead rail frame.

The holding means may be composed of a bent spring wire. The holding means can thus be manufactured in a cost-efficient way. In addition, the hooking protrusion can also be easily manufactured.

In some embodiments, regarding the self-clamping alternative of the tension rafter, the tension rafter has an elongated form and is capable of clamping itself into the second storage section in a force-locking manner by exerting a force in the longitudinal direction of the tension rafter. Thereby, no extra holding means are necessary at the second storage section and the embodiment provide for a very smooth and easy handling.

The force may be exerted by a spring comprised by the tension rafter, which pushes an abutment element of the tension rafter in the longitudinal direction of the tension rafter and the abutment element abuts against an end portion of the second storage section, when the tension rafter is stored therein. This is one illustrative way to create the force-locking.

The tension rafter may comprise the spring and the abutment element at each of its axial ends. This even increases the flexibility of the handling and, if once one of the mechanisms will not work anymore, the clamping still works because of the second one.

At least one end portion of the second storage section is represented by a tension rafter holder, designed as a counterpart to the abutment element which is variable in its position so that the length of the second storage section can be varied. This counterpart can also be defined as a tension rafter holder. An advantage of this embodiment is that, once the springs decrease in strength, the space provided by the second storage section can be downsized in order to get more force on the force-locking clamping again. Furthermore, various tension rafters different in length can be stored.

The tension rafter holder additionally provides for clamping the tension rafter into the second storage section in a form-locking manner. The form-locking provides further stability of the stored tension rafter in addition to the force-locking manner of the self-clamping.

The lead rail frame may comprise a first receiving portion and the main body comprises a second receiving portion, wherein the first and second receiving portions are configured to each receive an axial end of the tension rafter. When the awning assembly is in use, the tension rafter can thus easily be installed to the main body and to the lead rail frame so that tension is exerted on the flexible awning material.

The lead rail may comprise a carriage being mounted to the lead rail frame so as to be slidably movable along the longitudinal axis of the lead rail, wherein the at least one support leg is hingewise mounted to the carriage. Thus, the position of the support leg can be adjusted in its lateral position relative to the lead rail.

The carriage is slidably movable between a first position in the area of the first axial end of the lead rail frame and a second position in the area between the middle of the lead rail frame and the second axial end of the lead rail frame, wherein the at least one support leg is movable into the first storage section for every position of the carriage between the first position and the second position. Hence, this greatly reduces the lateral space requirements for moving the support leg from or to the first support portion. That is because the carriage can e.g. be slid into about the middle of the lead rail frame before the support leg is tilted into the first support portion. In addition, the awning assembly can thus be operated much easier, as the support leg can be moved along the lead rail frame even when being in the operating state, i.e. substantially perpendicular to the longitudinal axis of the lead rail.

BRIEF DESCRIPTION OF THE DRAWINGS

Next, the invention will be further described with reference to a specific embodiment shown in the drawings, wherein schematically

DETAILED DESCRIPTION

Figure 1:
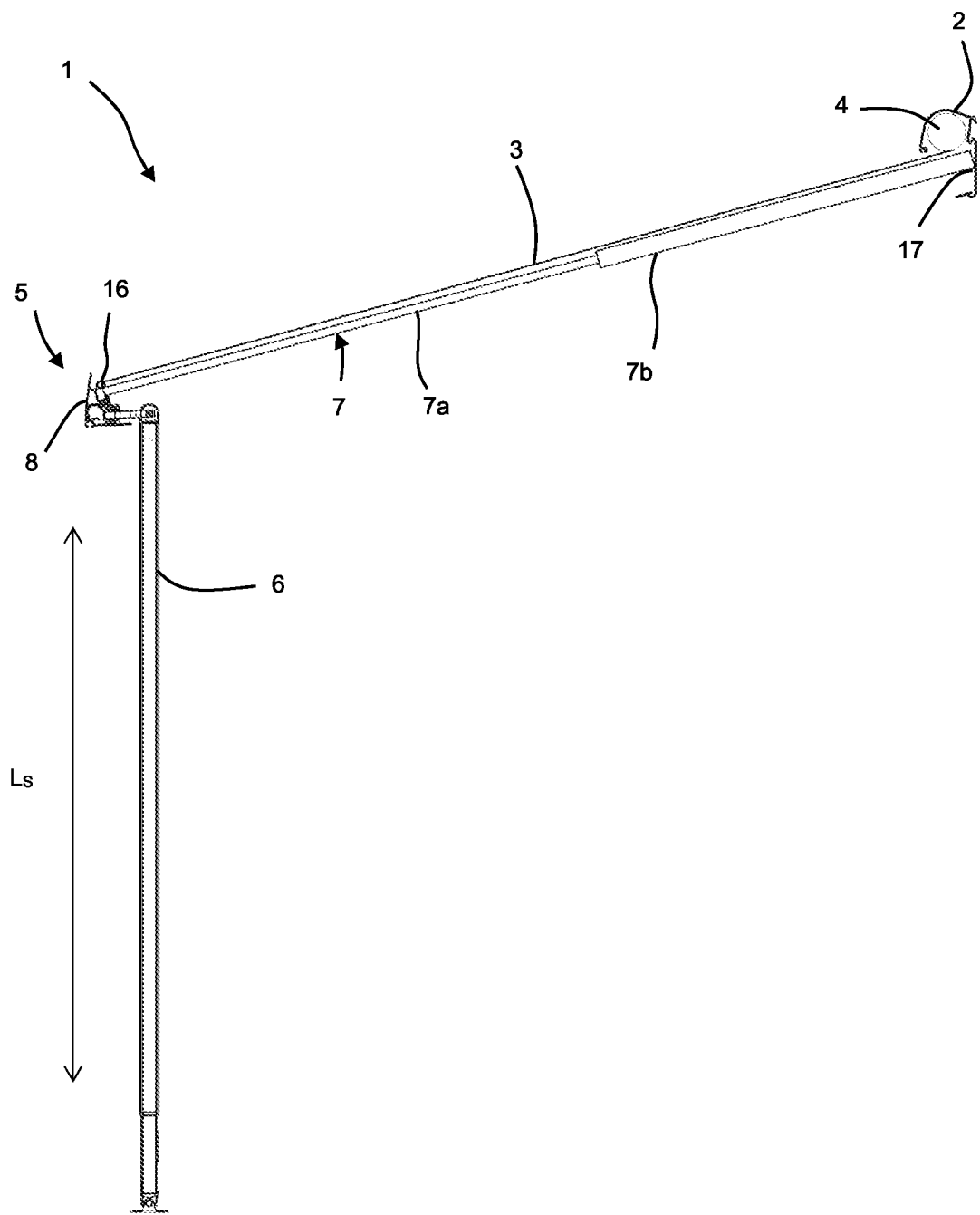
FIG. 1 is a cross sectional side view of an inventive awning assembly.
Figure 2:
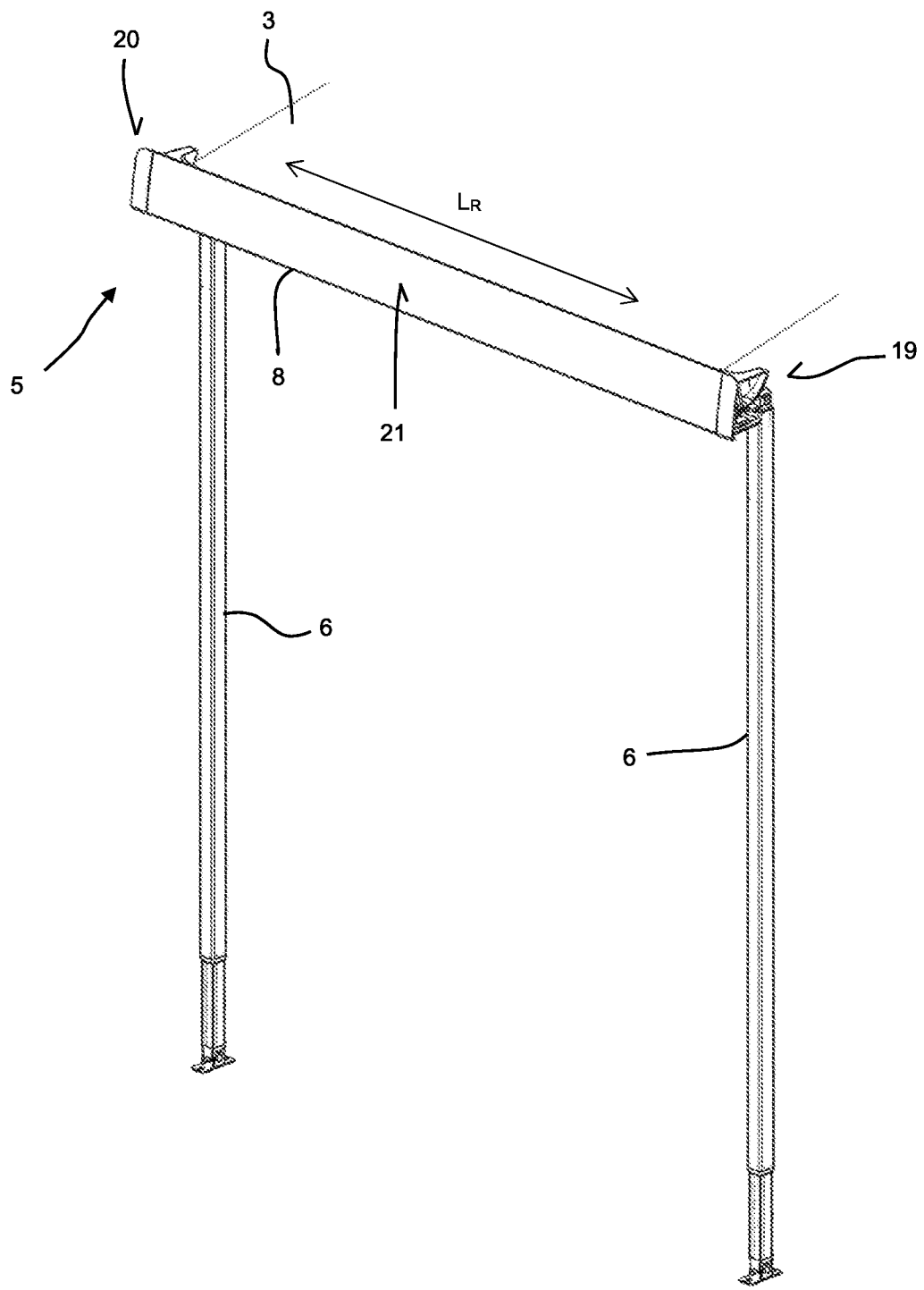
FIG. 2 is a perspective view of a front part of an inventive awning assembly.

In FIG. 1 and FIG. 2 there is shown an inventive awning assembly 1 in the operational state. The awning assembly 1 comprises a main body 2 attached to a (not shown) support structure of a (not shown) recreational vehicle in a known manner. The main body 2 comprises a roller tube 4 which is rotatably supported at the main body 2. The awning assembly 1 further comprises a lead rail 5 and a flexible awning material 3. A first end of the flexible awning material 3 is attached to the roller tube 4 and a second end of the flexible awning material 3 is attached to the lead rail 5. Moving the lead rail 5 relative to the main body 2 thus rolls the flexible awning material 3 onto the roller tube 4 or from the roller tube 4 in a known manner.

The lead rail 5 comprises a lead rail frame 8 and two support legs 6 which are hingewise mounted to the lead rail frame 8 via a carriage 18. The support legs 6 can be pivoted relative to the carriage 18 so that they are moved to or from a first storage section 9 of the lead rail frame 8, as will be explained in further detail below in reference to FIGS. 6 and 7.

The awning assembly 1 further comprises a tension rafter 7. As shown in FIG. 1, the tension rafter 7 is an elongated tubular member which comprises of two parts 7a, 7b which are telescopically mounted to each other. Thus, the tension rafter 7 can be adjusted in its axial extension in that the first part 7a is slidably extended from the second part 7b and the fixed against further movement in known manner, e.g. by rotating the first part 7a relative to the second part 7b. As can be further seen from FIG. 1, the axial end of the first part 7a of the tension rafter 7 is mounted to a first receiving section 16 of the lead rail frame 8, wherein the axial end of the second part 7b of the tension rafter 7 is mounted to a second receiving section 17 of the main body 2. Thus, the tension rafter 7 exerts tension onto the flexible awning material 3 and further supports the lead rail 5 in its position in combination with the support legs 6.

When the awning assembly 1 is in the non-usage state, the support legs 6 are located in the first storage section 9 (cf. e.g. FIG. 6) and the flexible awning material 3 is nearly completely rolled onto the roller tube 4. The tension rafter 7 is also demounted from the first and second receiving sections 16, 17 and the first part 7a is about completely disposed within the second part 7b. For storing the tension rafter 7, the lead rail frame 8 comprises a second storage section 10, which is integrally formed with the lead rail frame 8. In particular, the lead rail frame 8 of the present invention is made from continuous profile casting of e.g. an aluminum alloy.

Figure 3:
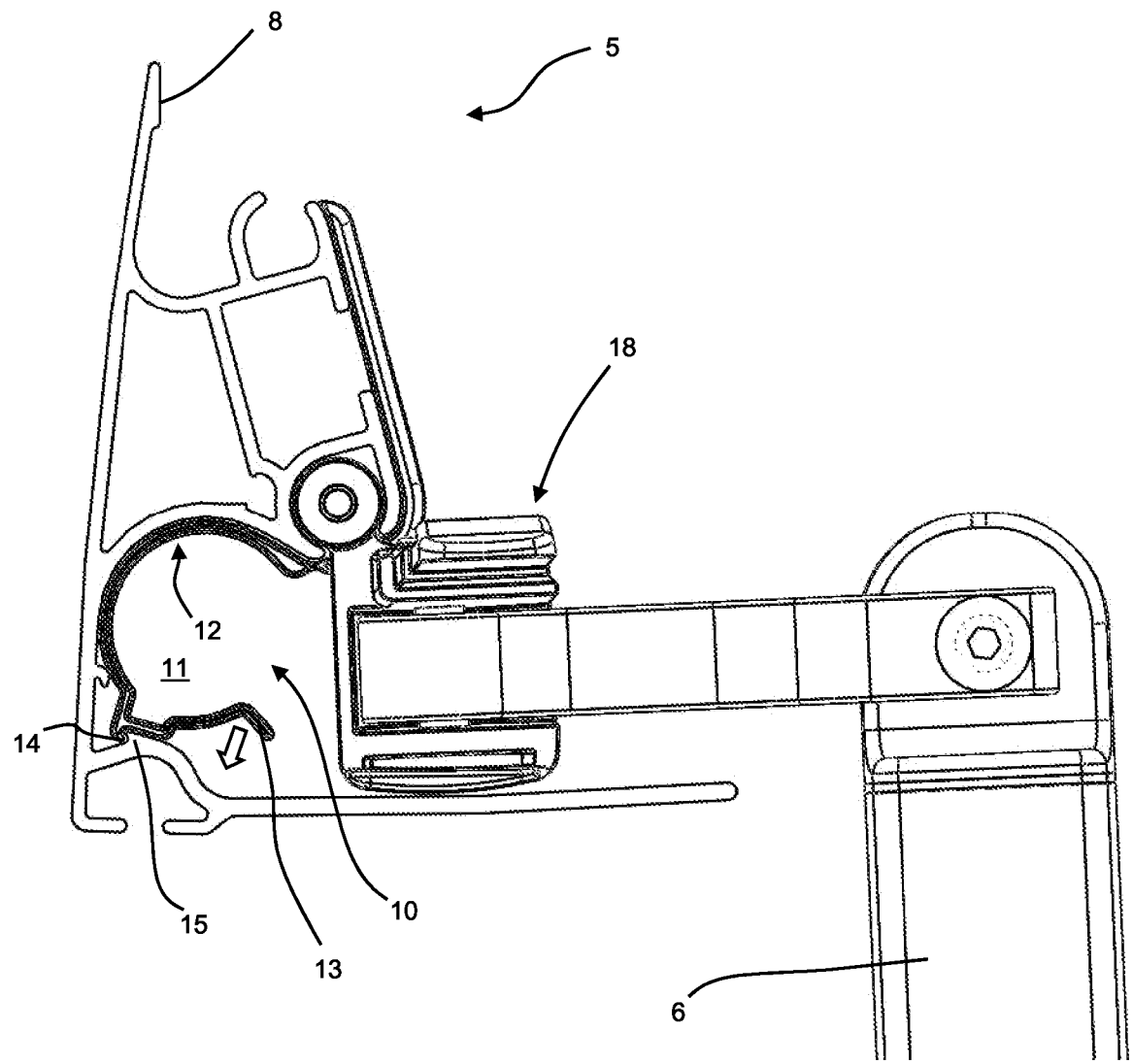
FIG. 3 is a first cross sectional view through the lead rail.
Figure 4:
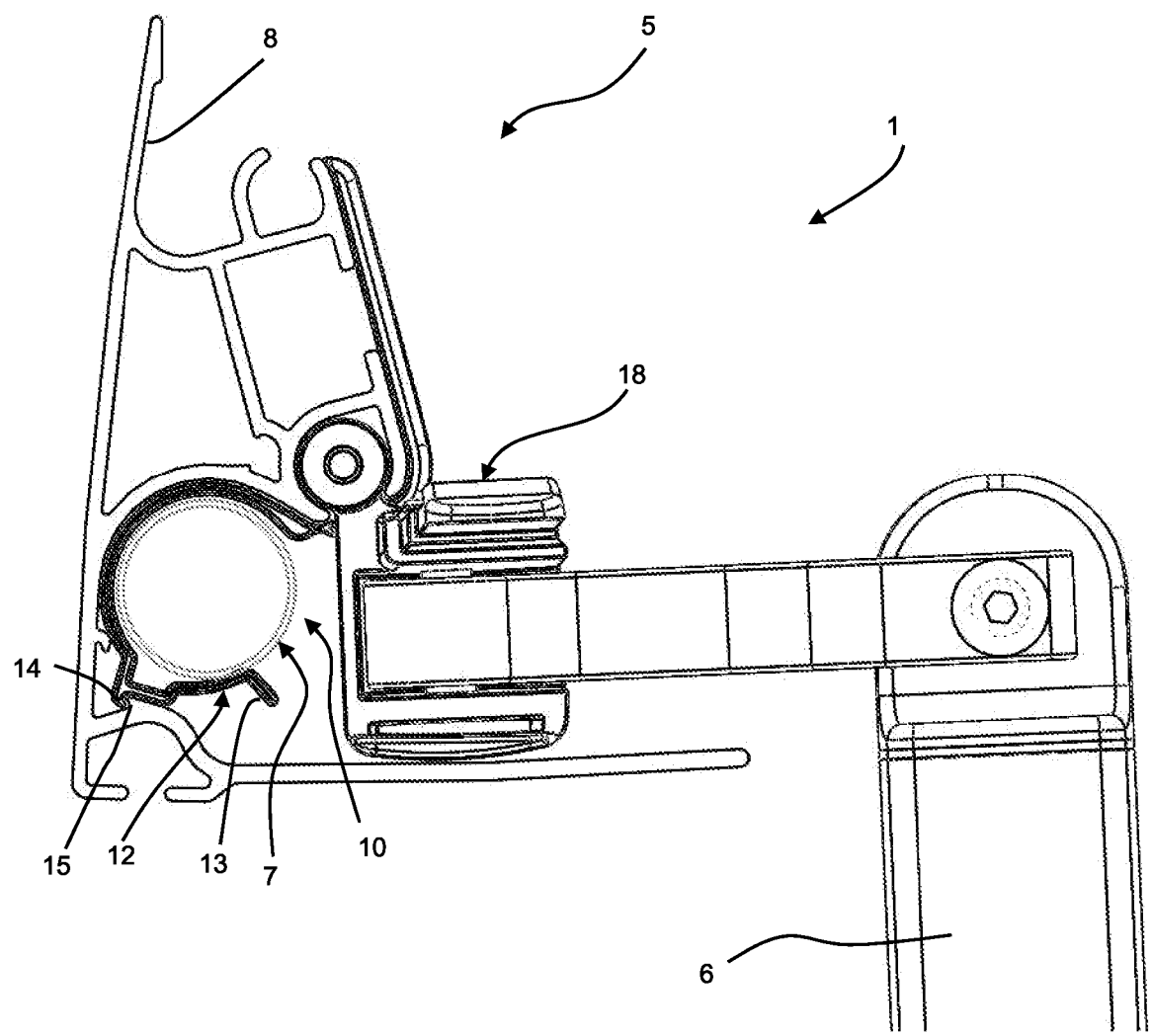
FIG. 4 is a second cross section view through the lead rail.
Figure 5:
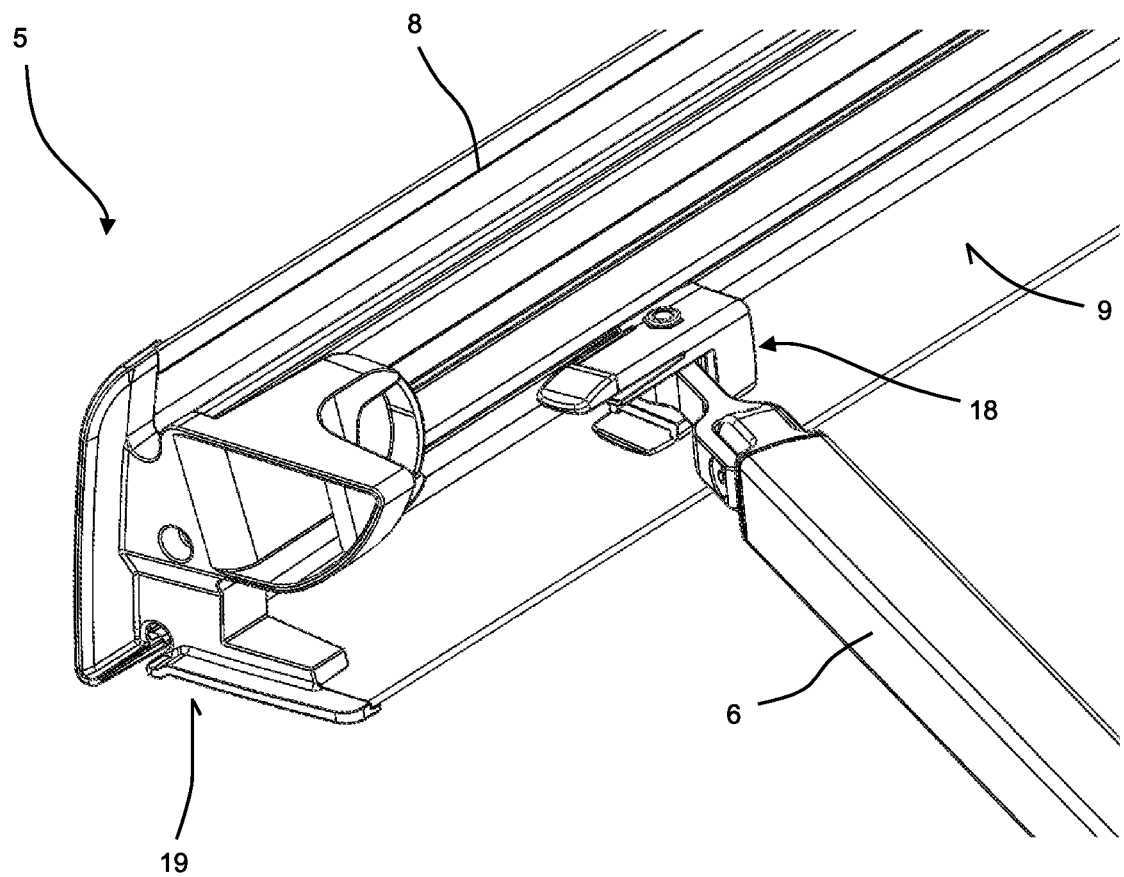
FIG. 5 is a first perspective view of a part of the lead rail.

As shown in FIGS. 3 and 4, the second storage section 10 comprises an opening 11 for introducing the tension rafter 7 into the second storage section 10. In addition, there is provided a holder or holding means 12 which is disposed within the opening 11 or in the area of the opening 11. The holding means 12 is composed of a bent spring wire and comprises a bracket 13 which can be manually moved between a holding position (as shown in FIG. 3) to a releasing position, the latter one being indicated by the bold arrow in FIG. 3. As the bracket 13 is also of flexible material, it returns into its original holding position when let loose. As a matter of course, the holder or holding means 12 can be composed of any suitable material having flexibility to hold the tension rafter 7.

In addition, the holding means 12 comprises a hooking projection 14 which hooks into an abutment projection 15 of the lead rail frame 8. As shown in FIG. 3 and FIG. 4 the abutment projection 15 is integrally formed with the lead rail frame 8 and extends into the second storage section 10. When the hooking projection 14 is hocked into the abutment projection 15, the holding means 12 is hindered from moving rotationally within the second storage section 10 when the bracket 13 is moved manually into the releasing position.

For introducing the tension rafter 7 into the second storage position 10 the bracket 13 is manually moved into the releasing position and the tension rafter 7 is inserted through the opening 11 into the second storage section 10. When the tension rafter 7 is completely disposed within the second storage section 10 the bracket 13 is unhanded and thus returns into the holding position. In said holding position the tension rafter 7 is form-locked fixed in the second storage section 10, as shown in FIG. 4.

To remove the tension rafter 7 again, the bracket 13 is manually moved into the releasing position and the form-lock fixing between the tension rafter 7 and the holding means 12 is suspended. Then, the tension rafter 7 can be removed from the second storage section 10 via the opening 11. After the tension rafter 7 is removed, the bracket 13 is again unhanded and it returns into its original holding position.

As shown in FIG. 2, the awning assembly comprises two support legs 6 each being mounted to the lead rail frame 8 via a carriage 18. The carriage 18 is slidably mounted to the lead rail frame 8 so as so be slidably movable along the longitudinal axis $L_R$ of the lead rail 5. In particular, each of the carriages 18 is movable between an axial end 19, 20 of the lead rail frame 8 and about the middle 21 of the lead rail frame 8.

As such, the carriage 18 the right support leg 6 shown in FIG. 2 is attached to is movable between a first position in the area of first axial end 19 of the lead rail frame 8 and a second position in the area between the second axial end 20 of the lead rail frame 8 and about the middle 21 of the lead rail frame 8. Hence, the carriage 18 of the left support leg 6 shown in FIG. 2 is attached to is movable between a first position in the area of second axial end 20 of the lead rail frame 8 and a second position in the area between the first axial end 19 of the lead rail frame 8 and about the middle 21 of the lead rail frame 8.

Figure 6:
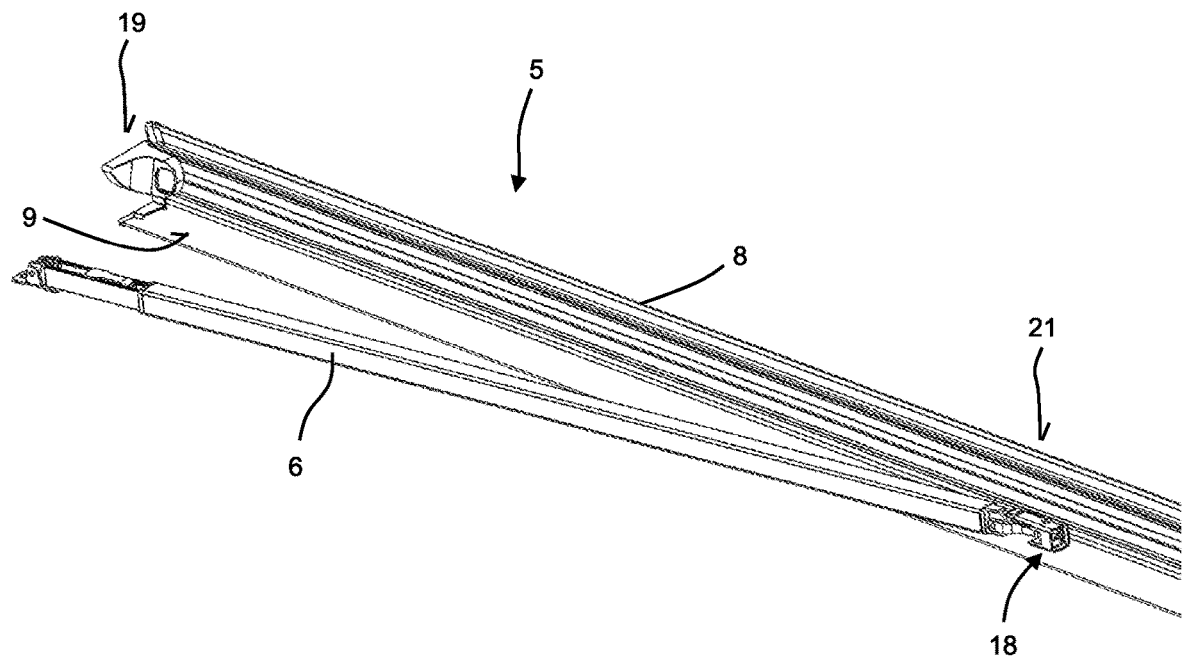
FIG. 6 is a second perspective view of a part of the lead rail.
Figure 7:
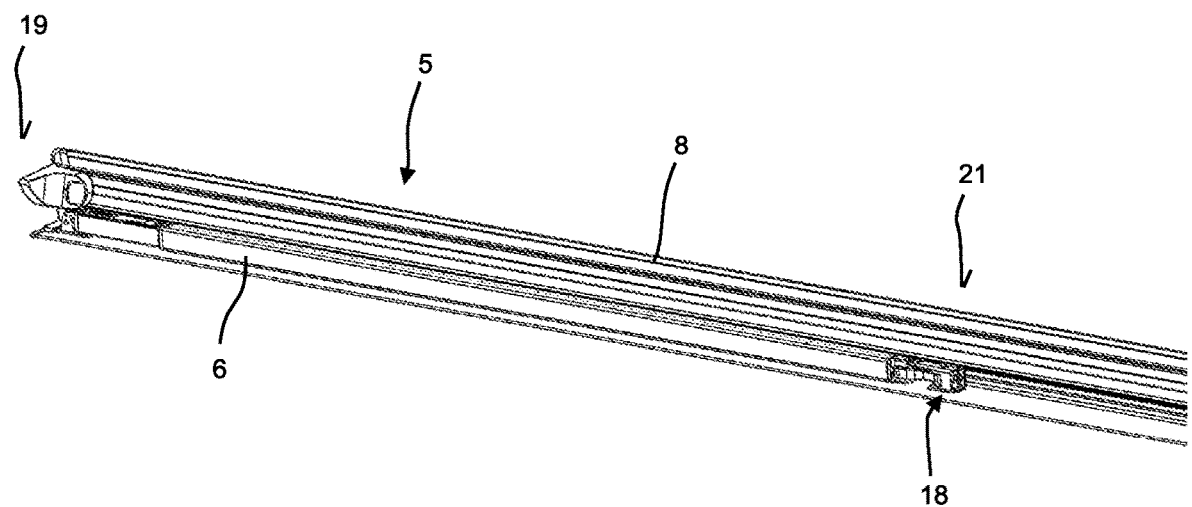
FIG. 7 is a third perspective view of a part of the lead rail.

As shown in FIG. 6 and FIG. 7 for moving the support leg 6 into the first storage section 9, the carriage 18 is slidably moved from the first position in the area of the first axial end 19 of the lead rail frame 8 into the second position which is about in the middle 21 of the lead rail frame 8. As the support leg 6 is hingewise mounted to the carriage, it can thus be pivoted or tilted so that the longitudinal axis $L_S$ of the support leg 6 is substantially parallel to the longitudinal axis $L_R$ of the lead rail 5. When assembling the awning assembly 1 into the operating state, the support leg 6 is first pivoted from the first storage position 9 into an operating position, i.e. a position where the support leg 6 is substantially perpendicular to the lead rail 5. Second, the carriage 18 is slidably moved from the second position in the area of the middle 21 of the lead rail frame 8 to the first position in the area of the first axial end 19 of the lead rail frame. An identical course of action is carried out for the other support leg 6. This also allows for facilitated handling, as the support legs 6 do not need to be tilted from a fixed position in the area of the axial ends 19, 20 of the lead rail 5.

Figure 8:
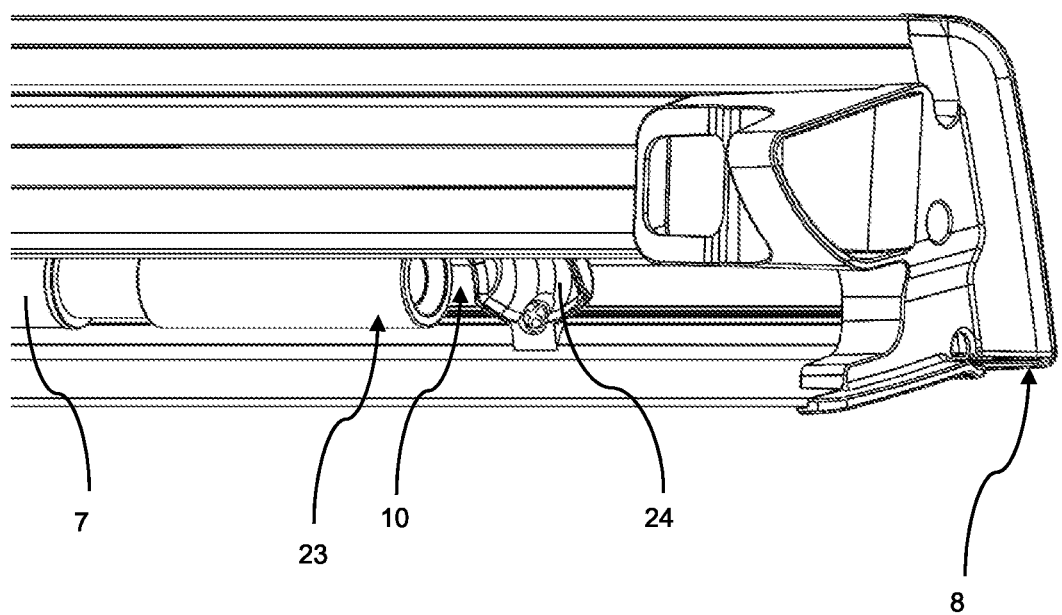
FIG. 8 is another perspective view from behind the lead rail.
Figure 9:
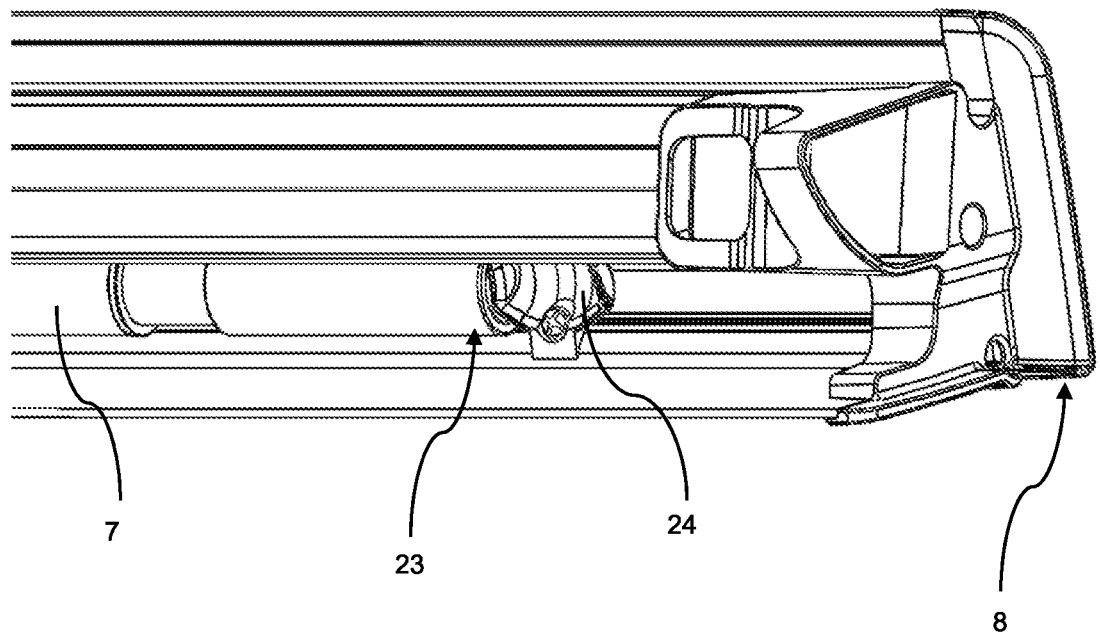
FIG. 9 is another perspective view from behind the lead rail.

In FIG. 8 the self-clamping alternative is illustrated with an exemplary embodiment. As can be seen, the tension rafter 7 is already placed within the space of the second storage section 10. In the shown situation, the abutment element 23 is still pushed away from the tension rafter holder 24 being designed as the counterpart to the abutment element 23. Now, when the abutment element is loosened somehow, it will be pushed by the spring inside the tension rafter 7 in the direction of the tension rafter holder 24 the result of which can be seen in FIG. 9. As shown therein, the tension rafter 7 is self-clamped into the second storage section 10 in a force-locking and form-locking manner. The holder 24 is formed such that it fits to the form of the abutment element 23, thereby forming the counterpart of the abutment element 23 at the contact portion of the two components. In order to take the tension rafter 7 out again, the abutment element 23 simply must be pushed back to disengage with the holder 24 again.

Figure 10:
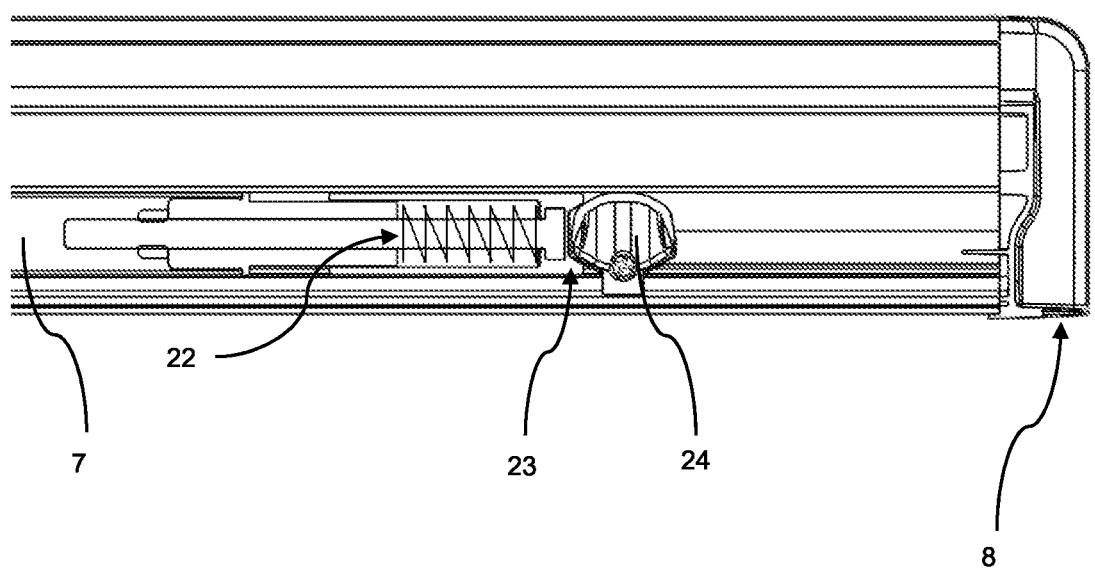
FIG. 10 is a view from behind the lead rail and an in-part cross-section of the tension rafter.
Figure 11:
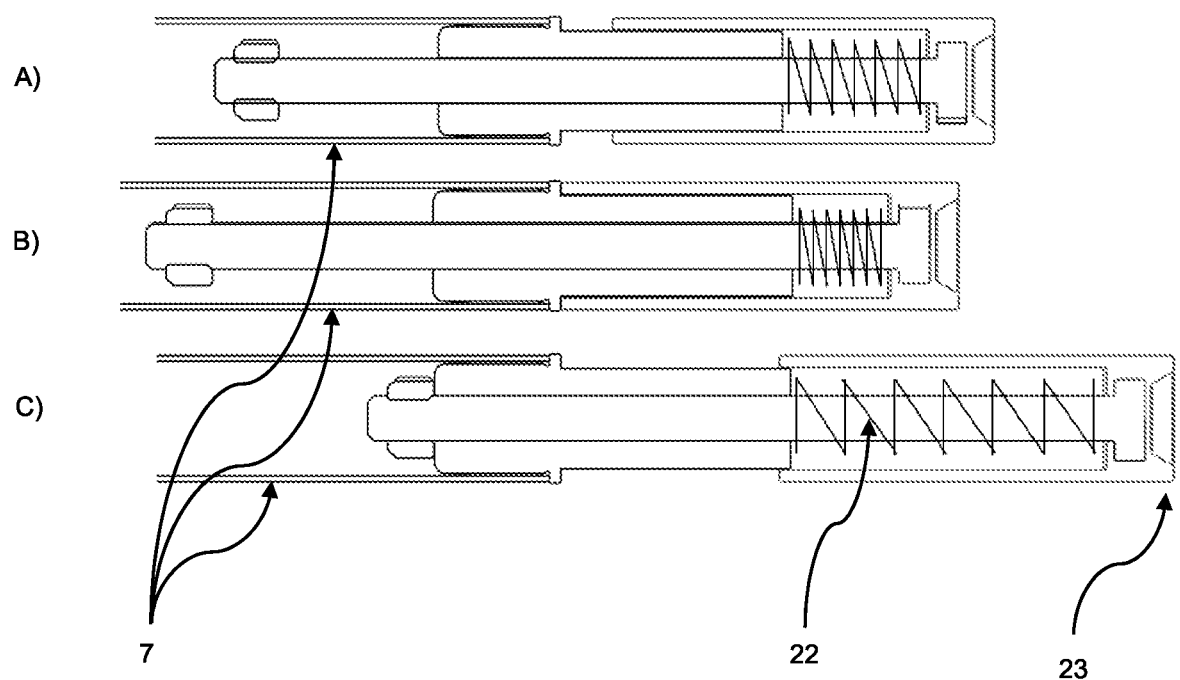
FIG. 11 shows three cross-sections of the tension rafter in three different situations.

As can be seen in FIG. 10, the force with which the abutment element 23 is pressed against the tension rafter holder 24 can be exerted by a spring 22 according to one embodiment of the invention. In some embodiments, the spring 22 is a coil spring which is wound around a piston having the abutment element 23 at its end corresponding to the axial end of the tension rafter 7. This embodiment of the tension rafter 7 is shown in the cross-sectional view of FIG. 11 in which three situations A, B and C are shown. As can be easily grasped from FIG. 11, Situation A represents a middle position of the abutment element 23, while situations B and C represent the two end positions, B the retracted and C the extended position.

LIST OF REFERENCE SIGNS 1 awning assembly
2 main body
3 flexible awning material
4 roller tube
5 lead rail
6 support leg
7 tension rafter
7a first part of tension rafter
7b second part of tension rafter
8 lead rail frame
9 first storage section
10 second storage section
11 opening
12 holding means
13 bracket
14 hooking projection
15 abutment protrusion
16 first receiving portion
17 second receiving portion
18 carriage
19 first axial end of lead rail frame
20 second axial end of lead rail frame
21 middle of lead rail frame
22 spring
23 abutment element
24 tension rafter holder
A middle position of self-clamping tension rafter
B retracted position of self-clamping tension rafter
C extended position of self-clamping tension rafter
$L_S$ longitudinal axis of support leg
$L_R$ longitudinal axis of lead rail

The invention claimed is:

1. An awning assembly, comprising:
an awning material which is connected at one end to a roller tube and at a second end to a lead rail, wherein the awning material is capable of being selectively rolled onto said roller tube or being selectively extended by movement of the lead rail relative to the awning roller tube;
said lead rail having a lead rail frame and a rearward storage section which extends longitudinally defining a longitudinal direction;
one or more support legs slidably and hingedly movable relative to the lead rail frame and wherein said one or more support legs can be pivoted into a support position that is perpendicular to the lead rail to support said lead rail;
a carriage having a first hinged connection to one of said one or more support legs, wherein said first hinged connection has a first pivot axis and a second hinged connection to the lead rail has a second pivot axis perpendicular to said first pivot axis, wherein said one or more support legs can be hingedly moved into said rearward storage section of said lead rail frame in which a longitudinal axis of each of said one or more support legs is substantially parallel to said longitudinal direction of the lead rail such that a bottom of the one or more support legs is positioned adjacent to a first axial end of the lead rail frame when the one or more support legs is stored in said rearward storage section;
said carriage being slidable within said rearward storage section, wherein in one position of said carriage, said one or more support legs may be pivoted into said support position, and wherein in a second position said one or more support legs may be pivoted into said rearward storage section;
said lead rail having a forward storage section configured to store each of one or more tension rafters, wherein said forward storage section is further from said awning material than said rearward storage section.

2. The awning assembly of claim 1, said forward storage section is integrally formed in the lead rail.

3. The awning assembly of claim 1, said forward storage section receiving an axial end of said one or more tension rafters.

4. The awning assembly of claim 1, further comprising a spring disposed in said forward storage section to retain said one or more tension rafters.

5. The awning assembly of claim 4, wherein the one or more tension rafters each has an elongated form and is clamped into the forward storage section in a force-locking manner by exerting a force in a longitudinal direction of the one or more tension rafters.

6. The awning assembly of claim 4, further comprising an abutment element of the one or more tension rafters in a longitudinal direction of the one or more tension rafters and wherein the abutment element abuts against an end portion of the forward storage section when the one or more tension rafters is stored therein.

7. The awning assembly of claim 1, each of said one or more tension rafters further comprising a tension rafter holder which retains the one or more tension rafters.

8. The awning assembly of claim 1, said forward storage section comprising a first receiving portion and a second receiving portion, each of which receive one tension rafter of said one or more tension rafters.

9. The awning assembly of claim 4, further comprising a bracket which extends from said spring.

10. The awning assembly of claim 9, said bracket being movable to release each of said one or more tension rafters from said spring.

11. The awning assembly of claim 1, wherein said one or more support legs comprise two support legs.

12. The awning assembly of claim 1, wherein said one or more tension rafters comprise two tension rafters.

* * * * *